United States Patent Office 2,744,899
Patented May 8, 1956

2,744,899

4-(β-SUBSTITUTED AMINOETHYL)-IMIDAZOLES AND THE PREPARATION THEREOF

Charles F. Huebner, Morristown, N. J., assignor to Ciba Pharmaceutical Products, Incorporated, Summit, N. J., a corporation of New Jersey No Drawing. Application March 2, 1951,
Serial No. 213,668

9 Claims. (Cl. 260—247.5)

The present invention relates to 4-(β-substituted aminoethyl)-imidazoles and to the preparation thereof.

A primary object of the invention is the embodiment of a new group of imidazole compounds which are characterized by histamine-like activity and which, in marked contrast to the long and tedius methods heretofore generally required for the preparation of compounds of this type, can be prepared in good yields and from readily available materials by a short and convenient method.

This object, and others which will be evident from the following specification, is realized according to the present invention whereby the desired new 4-(β-substituted aminoethyl)-imidazoles, which may be further substituted in the 2-position, are easily prepared in good yields and from readily available starting materials in a two-stage process which, if desired, may be carried out without isolation of intermediates.

According to the invention, the desired products are obtained by treating hydroxymethyl-vinyl ketone with a secondary amine, preferably in a suitable solvent, to form the corresponding aminoethyl-hydroxymethyl ketone which, with or without isolation from the reaction mass, is then reacted with an aldehyde and ammonia in the presence of cupric ion to form the desired imidazole. The process proceeds according to the following reaction scheme:

Stage I:

$HOCH_2.CO.CH=CH_2 + HR_1 \longrightarrow HOCH_2.CO.CH_2CH_2R_1$

Stage II:

$HOCH_2.CO.CH_2CH_2R_1 + RCHO + NH_3 \xrightarrow{Cu^{++}}$

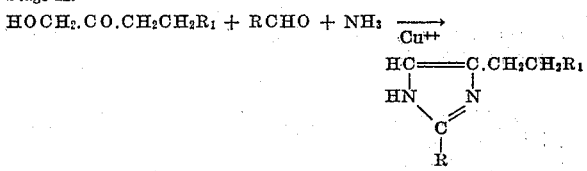

wherein R stands for a hydrogen atom or an alkyl or aryl group, and R₁ stands for a dialkylamino radical or a cycloaliphatic amino radical such as piperidino, morpholino or the like.

The solvent, in which the reactions are preferably carried out, is an hydroxylated solvent such as water, a lower aliphatic alcohol such as methyl alcohol, ethyl alcohol and the like, or a mixture of these. The reaction between the vinyl ketone and the amine in Stage 1 proceeds rapidly at room temperature, while the reaction of Stage 2 proceeds advantageously at more elevated temperatures, such as those of the steam bath.

The secondary amine employed for the reaction with the vinyl ketone is a dialkylamine such as dimethylamine, diethylamine, methylethylamine and the like, a dialkylolamine such as diethanolamine and the like, or a heterocyclic amine such as piperidine, morpholine and the like.

The aldehyde utilized in the reaction of Stage II is an aliphatic aldehyde such as formaldehyde, acetaldehyde and the like, or an aryl aldehyde such as benzaldehyde, the nucleus of which may be substituted by one or more groups such as alkyl, hydroxy, alkoxy, amino, acylamino, carboxy, halogen and the like, for example, tolualdehyde, chlorobenzaldehyde, salicylaldehyde, etc.

Any soluble cupric salt may be employed as the source of the cupric ion in Stage II. A preferred salt in this regard is cupric acetate (which is mentioned in the several examples which follow), but other salts—such for example as copper sulfate, copper nitrate, etc.—may also be employed.

The products may be conveniently obtained as the free base or, particularly where the salts crystallize more easily, in the form of salts such as the hydrochloride, picrate, picryl-sulfonate, tartrate, methane-sulfonate, etc. In those cases in which the bases are highly water-soluble, the free base may be recovered from its salt, for example, by making its aqueous solution alkaline with an alkali metal hydroxide such as sodium hydroxide or with a carbonate such as sodium carbonate, concentrating to dryness and distilling the base in vacuo, or alternatively by extraction of the base with a solvent such as absolute ethanol, followed by removal of the solvent and distillation of the base in vacuo. Where the base is water-insoluble, as for example in the case of the 2-phenyl-imidazoles, the base is obtained by basifying the solution of the salt with a base such as ammonia and separating the precipitated amine by filtration.

The products of the invention exhibit marked histamine-like activity, and are therefore useful therapeutically.

The examples hereinafter set forth illustrate the invention in greater detail, but it is to be understood that they are presented by way of illustration only and not by way of limitation. Temperatures are given in degrees centigrade and all melting points given are uncorrected. Parts by weight bear the same relation to parts by volume as do grams to milliliters. Percentages are by weight.

Example 1

To 100 parts by volume of an aqueous solution containing 6% of hydroxymethyl-vinyl ketone (prepared according to the method described in "Acetylene and Carbon Monoxide Chemistry," Copenhaver and Bigelow, Reinhold Publishing Corporation, New York [1949], page 137) are added 6 parts by volume of piperidine. After standing fifteen minutes at room temperature, the resulting solution is added to a solution of 30 parts by weight of cupric acetate and 15 parts by volume of 36% aqueous formaldehyde solution in 225 parts by volume of concentrated aqueous ammonia. The obtained mixture is heated on the steam bath for one hour, the formed insoluble copper salt of the imidazole is collected, suspended in 100 parts by volume of hot water, and hydrogen sulfide passed through the mixture while adding concentrated aqueous hydrochloric acid slowly to maintain the mixture acid to Congo red. Decolorizing carbon is added and the precipitated sulfide removed by filtration. The filtrate is concentrated to dryness and the residue crystallized from ethanol-methylethyl ketone, whereupon 4-(β-piperidinoethyl)-imidazole dihydrochloride:

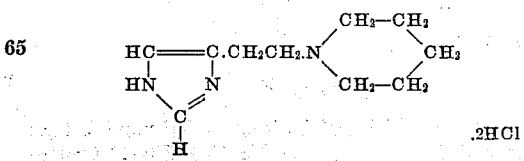

is obtained; it melts at 275–278°.

Twenty parts by weight of the 4-(β-piperidinoethyl)- imidazole dihydrochloride are warmed with a mixture of 20 parts by weight of sodium carbonate and 20 parts by volume of water, whereupon the imidazole separates as an oil. Several extractions with ethyl acetate remove the imidazole from the aqueous phase. The ethyl acetate is dried over sodium sulfate and removed in vacuo. The remaining oil is distilled at 200–210° and 10 mm. pressure to yield the pure 4-(β-piperidinoethyl)-imidazole which crystallizes on standing, and has a melting point of 104–106°.

*Example 2*

To 100 parts by volume of an aqueous solution containing 6% of hydroxymethyl-vinyl ketone are added 12 parts by volume of a 32% aqueous solution of dimethylamine. After fifteen minutes standing at room temperature during which time slight warming occurs, the solution is added to a solution of 30 parts by weight of cupric acetate and 15 parts by volume of aqueous formaldehyde solution (36%) in 225 parts by volume of concentrated aqueous ammonia. After heating the resulting mixture on the steam bath for one hour and decomposing the copper salt as described in Example 1, a hot aqueous solution of 10 parts by weight of picric acid is added to the filtrate. The crystalline picrate separates out on cooling and is recrystallized from water; it melts at 229–230°.

The picrate is converted to the dihydrochloride by decomposition with dilute aqueous hydrochloric acid and extraction of the picric acid with ether. On concentrating the remaining aqueous solution to dryness and recrystallization of the residue from ethanol-methylethyl ketone, 4-(β-dimethylaminoethyl)-imidazole dihydrochloride:

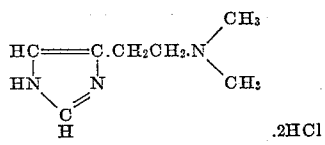

is obtained; it melts at 184–185°.

By replacing the dimethylamine by a corresponding quantity of diethylamine and otherwise proceeding as described, the 4-(β-diethylaminoethyl)-imidazole hydrochloride, melting at 217–220°, is obtained. By similarly employing the di-n-propylamine, the corresponding di-n-propyl amino derivative is obtained. The dihydrochloride is, in this case, non-crystalline; the product may be recovered in crystalline form as the dipicrate which melts at 190°.

*Example 3*

To 100 parts by volume of an aqueous solution containing 6% of hydroxymethyl-vinyl ketone are added 6 parts by volume of piperidine. After standing fifteen minutes at room temperature, this solution is added to a solution of 30 parts by weight of cupric acetate and 5 parts by weight of acetaldehyde in 225 parts by volume of concentrated ammonia. The dipicrate, melting at 153–154°, is prepared and converted as described in Examples 1 and 2 into the dihydrochloride of 2-methyl-4-(β-piperidinoethyl)-imidazoline:

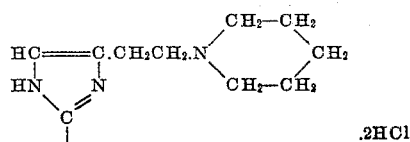

which is obtained as a syrup.

*Example 4*

To 2 parts by weight of hydroxymethyl-vinyl ketone ("Acetylene and Carbon Monoxide Chemistry," Copenhaver and Bigelow, Reinhold Publishing Corporation, New York [1939], page 136) are added 2 parts by weight of piperidine in 10 parts by volume of ethanol, with rapid mixing. A spontaneous reaction occurs with evolution of heat. After two minutes, the obtained solution is added to a solution of 10 parts by weight of cupric acetate and 2.5 parts by weight of propionaldehyde in 75 parts by weight of concentrated aqueous ammonia, and the mixture heated on the steam bath for 1 hour. The formed insoluble copper salt is collected, suspended in 100 parts by volume of hot water, and hydrogen sulfide passed through the mixture while adding concentrated aqueous hydrochloric acid slowly to maintain the mixture acid to Congo red. Decolorizing charcoal is added and the solid removed by filtration, and to the filtrate is added with stirring a solution of 12 parts by weight of picryl-sulfonic acid in 100 parts by volume of water. The dipicryl-sulfonate is recrystallized from large volumes of water; the product melts at 253°.

The dipicryl-sulfonate is decomposed with aqueous hydrochloric acid, the picryl-sulfonic acid extracted with n-butanol and the aqueous solution concentrated to dryness. The dihydrochloride of 2-ethyl-4-(β-piperidinoethyl)-imidazoline:

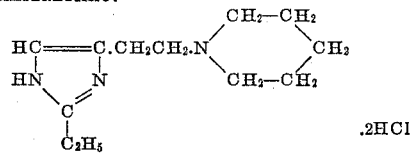

is obtained as a syrup.

*Example 5*

To 2 parts by weight of freshly distilled hydroxymethyl-vinyl ketone are added 2 parts by weight of piperidine in 10 parts by volume of ethanol, with rapid mixing. After two minutes, the resulting solution is added to a solution of 10 parts by weight of cupric acetate and 3 parts by weight of benzaldehyde in 75 parts by volume of concentrated ammonia, and the mixture heated on the steam bath for 1 hour. After removal and decomposition of the copper salt as described in Example 1, aqueous ammonia is added to the obtained solution of 2-phenyl-4-(β-piperidinoethyl)-imidazole hydrochloride. The crystalline imidazole base:

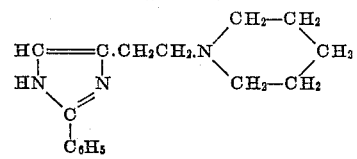

is collected and recrystallized from ethanol-water; it melts at 156–158°.

*Example 6*

To 100 parts by volume of an aqueous solution containing 6% of hydroxymethyl-vinyl ketone are added 12 parts by volume of a 32% aqueous solution of dimethylamine. After standing at room temperature for fifteen minutes, this solution is added to a solution of 30 parts by weight of cupric acetate and 9 parts by weight of benzaldehyde in 25 parts by volume of concentrated ammonia. The mixture is heated on the steam bath for one hour, the formed copper salt decomposed and the crystalline 2-phenyl-4-(β-dimethylaminoethyl)-imidazole dipicrate, melting at 218–220°, prepared as described in Example 2 by the addition of an aqueous solution of 10 parts by weight of picric acid. The dipicrate can be converted, with the aid of hydrochloric acid, to the corresponding dihydrochloride:

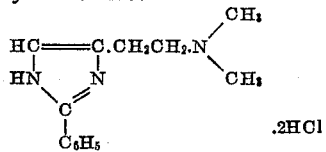

which melts at 270–275°.

By employing a corresponding quantity of methyl-ethylamine in place of the dimethylamine and otherwise proceeding as described, the corresponding 2-phenyl-4-(β-N-methyl-N-ethyl-aminoethyl)-imidazole dihydrochloride is obtained.

*Example 7*

To 100 parts by volume of an aqueous solution containing 6% of hydroxymethyl-vinyl ketone are added 5.3 parts by volume of morpholine. After standing at room temperature for fifteen minutes, the resulting solution is added to a solution of 30 parts by weight of cupric acetate and 15 parts by volume of 36% aqueous formaldehyde solution in 225 parts by volume of concentrated aqueous ammonia. After evaporation of the solution resulting from the decomposition of the copper salt with hydrogen sulfide in the presence of hydrochloric acid, as described in Example 1, the crystalline residue of 4-(β-morpholinoethyl)-imidazole dihydrochloride:

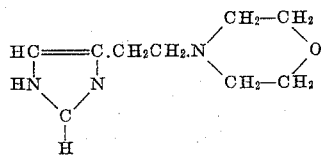

results. It is recrystallized from ethanol-ether; melting point 238–243°.

Having thus disclosed the invention what is claimed is:

1. The process of preparing an imidazole having the structure:

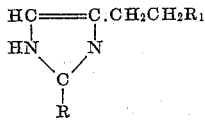

wherein R is a member selected from the group consisting of hydrogen, lower alkyl and mononuclear carbocyclic aryl free from substituents which interfere with the reaction, and R₁ is a radical selected from the group consisting of lower dialkylamino, piperidino and morpholino, which comprises the steps of reacting hydroxymethyl-vinyl ketone with a secondary aliphatic amine corresponding to the formula R₁H, wherein R₁ has the precedingly-indicated significance, and heating the resulting substituted aminoethyl hydroxymethyl ketone in solution with ammonia and an aldehyde corresponding to the formula RCHO, R having the precedingly-indicated significance, in the presence of cupric ions, whereby the isolation of intermediates is unnecessary.

2. The process according to claim 1 wherein the amine is piperidine.

3. The process according to claim 1 wherein the amine is a lower dialkylamine.

4. The process of preparing 2-methyl-4-(β-piperidinoethyl)-imidazole which comprises reacting hydroxymethyl-vinyl ketone with piperidine, and treating the resulting piperidinoethyl-hydroxymethyl ketone in solution with ammonia and acetaldehyde in the presence of cupric ions, whereby the isolation of intermediates is unnecessary.

5. The process of preparing 2-ethyl-4-(β-piperidinoethyl)-imidazole which comprises reacting hydroxymethyl-vinyl ketone with piperidine, and treating the resulting piperidinoethyl-hydroxymethyl ketone in solution with ammonia and propionaldehyde in the presence of cupric ions, whereby the isolation of intermediates is unnecessary.

6. The process of preparing 2-phenyl-4-(β-piperidinoethyl)-imidazole which comprises reacting hydroxymethyl-vinyl ketone with piperidine, and treating the resulting piperidinoethyl-hydroxymethyl ketone in solution with ammonia and benzaldehyde in the presence of cupric ions, whereby the isolation of intermediates is unnecessary.

7. The process of preparing 2-phenyl-4-(β-dimethylaminoethyl)-imidazole which comprises reacting hydroxymethyl-vinyl ketone with dimethylamine, and treating the resultant dimethylaminoethyl hydroxymethyl ketone in solution with ammonia and benzaldehyde in the presence of cupric ions, whereby the isolation of intermediates is unnecessary.

8. The process of preparing 4-(β-morpholinoethyl)-imidazole which comprises reacting hydroxymethyl-vinyl ketone with morpholine, and treating the resulting morpholinoethyl-hydroxymethyl ketone in solution with ammonia and formaldehyde in the presence of cupric ions, whereby the isolation of intermediates is unnecessary.

9. The process of preparing an imidazole having the structure:

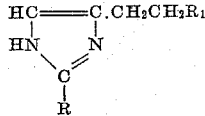

wherein R is a member selected from the group consisting or hydrogen, lower alkyl and mononuclear carbocyclic aryl free from substituents which interfere with the reaction, and R₁ is a radical selected from the group consisting of lower dialkylamino, piperidino and morpholino, which comprises heating an aminoethyl hydroxymethyl ketone corresponding to the formula

HOCH₂COCH₂CH₂R₁ in solution with ammonia and an aldehyde corresponding to the formula

RCHO

R and R₁ having the precedingly-indicated significances, in the presence of cupric ions.

References Cited in the file of this patent
UNITED STATES PATENTS 2,376,424 Fell _____ May 22, 1945
2,532,547 Goldberg et al. _____ Dec. 5, 1950

OTHER REFERENCES

Turner et al.: JACS, vol. 70, p. 3523 (1948).
Turner et al.: JACS, vol. 71, pp. 2801–3 (1949).
Idson Chemical Reviews, vol. 47, pp. 488–9 (1950).